United States Patent
Hermann et al.

(10) Patent No.: US 7,001,226 B2
(45) Date of Patent: Feb. 21, 2006

(54) CONNECTING CABLE

(75) Inventors: Rouven Hermann, Leonberg (DE); Alexander Rosenthal, Boeblingen (DE); Marco Schweizer, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/910,062

(22) Filed: Aug. 3, 2004

(65) Prior Publication Data

US 2005/0032439 A1    Feb. 10, 2005

(30) Foreign Application Priority Data

Aug. 5, 2003  (DE) ................ 103 35 733

(51) Int. Cl.
   *H10R 4/42*   (2006.01)
(52) U.S. Cl. ..................................... 439/763
(58) Field of Classification Search ............... 439/763, 439/761, 762, 764, 907
   See application file for complete search history.

(56) References Cited

U.S. PATENT DOCUMENTS

| 1,663,013 A | 3/1928 | Logan |
| 3,546,664 A * | 12/1970 | De Bolt et al. ............. 439/866 |
| 5,154,646 A | 10/1992 | Shoup ......................... 439/765 |
| 5,696,493 A * | 12/1997 | Einck .......................... 340/623 |
| 2002/0153860 A1 | 10/2002 | Liang ......................... 320/105 |

FOREIGN PATENT DOCUMENTS

| CH | 232 734 | 9/1944 |
| DE | 94 02 317 | 5/1994 |
| DE | 296 20 311 | 2/1997 |
| DE | 297 17 896 | 1/1998 |
| DE | 198 59 803 | 7/2000 |
| DE | 201 20 933 | 5/2001 |
| DE | 101 28 149 | 12/2002 |
| GB | 588 027 | 5/1947 |
| GB | 2 318 459 | 4/1998 |

* cited by examiner

*Primary Examiner*—Gary Paumen
*Assistant Examiner*—Phuongchi Nguyen
(74) *Attorney, Agent, or Firm*—Davidson, Davidson & Kappel, LLC

(57) ABSTRACT

A pole terminal (10) for connection to a connecting pin of a vehicle battery having a clamping element (12) for at least partially engaging around a circumference of a clamping section of the connecting pin and having a connecting device (16) for one or more power cables. In addition to the clamping element (12), a connecting pin (18) is provided, whose circumferential dimensions in one clamping section correspond, within a predeterminable tolerance, to the circumferential dimensions of the clamping section of the connecting pin of the vehicle battery.

7 Claims, 2 Drawing Sheets

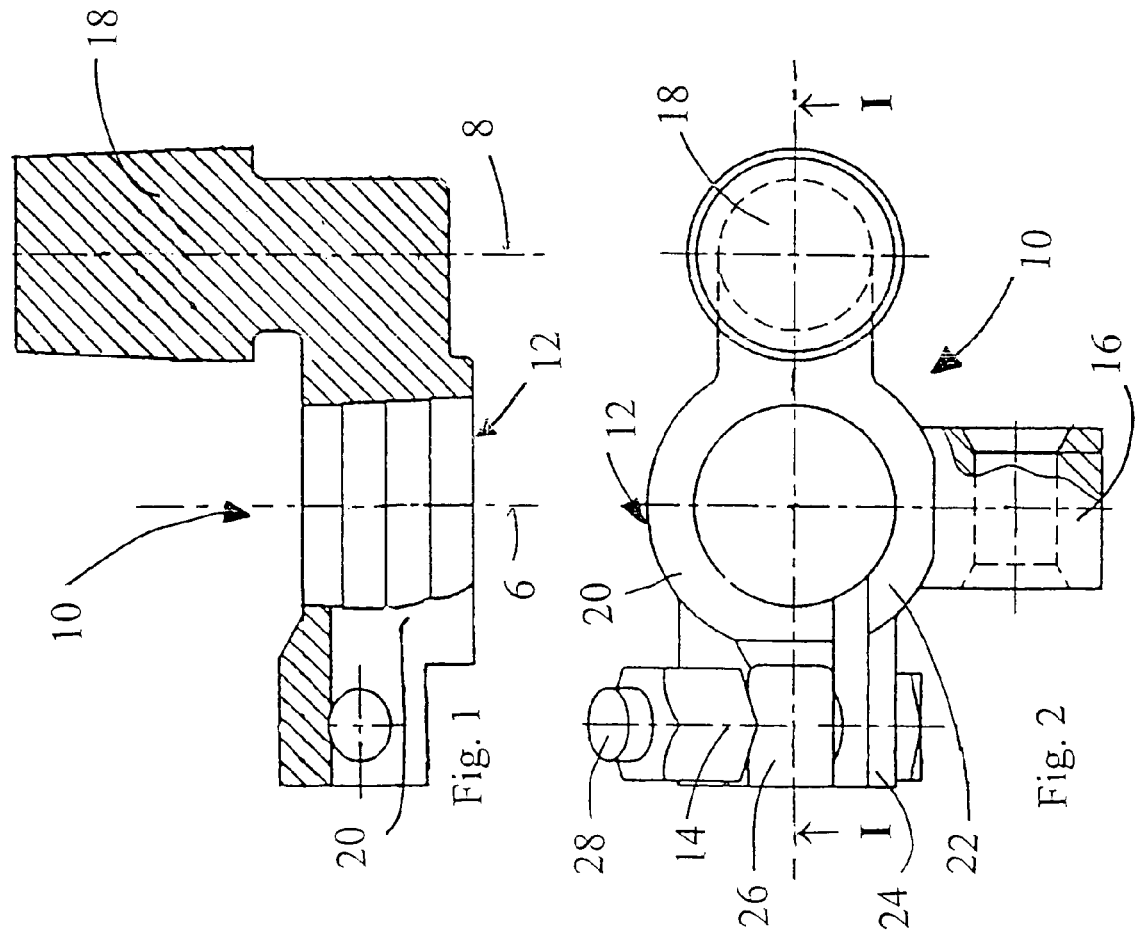
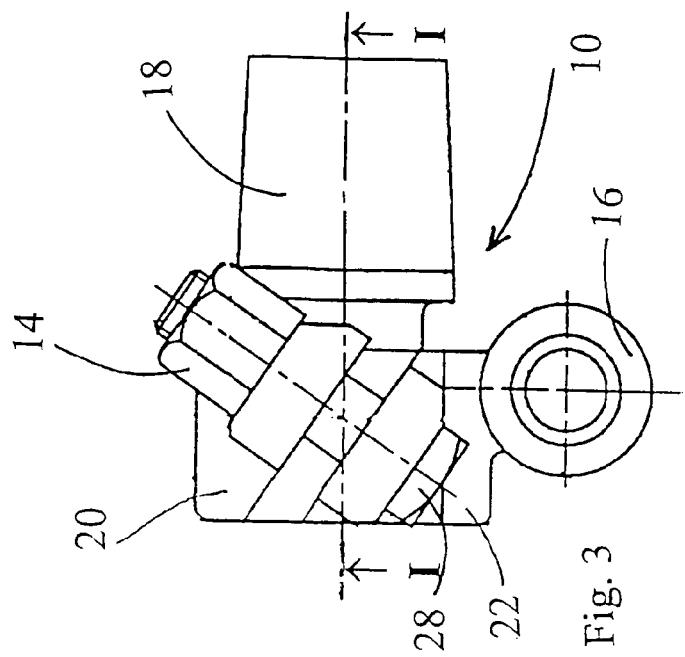
Fig. 1
Fig. 2
Fig. 3

CONNECTING CABLE

This claims the benefit of German Patent Application No. 103 35 733.5, filed Aug. 5, 2003 and hereby incorporated by reference herein.

BACKGROUND

The present invention relates to a pole terminal for connection to a connecting pin of a vehicle battery having a clamping element for at least partially engaging around a circumference of a clamping section of the connecting pin and having a connecting device for a power cable.

A pole terminal having a clamping element for connection to a connecting pin of a vehicle battery is disclosed, for example, in the German Laid-Open Specification DE 10128149 A1. The pole terminal illustrated in this specification offers possibilities for connecting one or more power cables, firstly by means of clamping barrels or tubes for clamping-in the cable wires, and secondly by means of screwed-on cable ears.

BRIEF SUMMARY OF THE INVENTION

The present invention is intended to make it possible to connect a battery pole of a vehicle battery in a simple manner to more than one individually releasable power cable, in order thus to make it possible, for example, to connect vehicle batteries in parallel.

For this purpose, the invention provides a pole terminal for connection to a connecting pin of a vehicle battery having a clamping element for at least partially engaging around a circumference of a clamping section of the connecting pin and having a connecting device for a power cable, which, in addition to the clamping element, has a connecting pin, whose circumferential dimensions in one clamping section correspond, within a predeterminable tolerance, to the circumferential dimensions of the clamping section of the connecting pin of the vehicle battery.

Such a pole terminal makes it possible to connect a further pole terminal, which is connected to a power cable which can produce, for example, the connection to a further vehicle battery which is connected in parallel with the vehicle battery. One advantage of this solution is the fact that, apart from the pole terminal according to the present invention, all the remaining components can remain unchanged from those in the conventional design. It is thus possible, for example, for two vehicle batteries to be connected in parallel in one vehicle, without it being necessary to prepare the battery connecting cable and pole terminals of the vehicle in a particular manner for this purpose. The pole terminal according to the present invention also makes it possible, when two or more vehicle batteries are connected directly in parallel, for the battery cable to be released reliably without the need for a special tool. The tolerance of the circumferential dimensions of the connecting pin in one clamping section with respect to the circumferential dimensions of the clamping section of the connecting pin of the vehicle battery is preferably ±10%. In any case, the connecting pin of the pole terminal according to the present invention is dimensioned such that, for this type of battery, conventional pole terminals can be connected.

In one refinement of the present invention, the pole terminal is designed such that the central longitudinal axis of the clamping section of the connecting pin is aligned parallel to a central longitudinal axis of the clamping element.

One advantage of this design is the fact that a further pole terminal, which is intended to be connected to the pole terminal according to the present invention, is mounted with the same orientation as said pole terminal according to the present invention.

In one refinement of the present invention, at least the clamping section of the connecting pin of the pole terminal is frustoconical.

There is expediently a tapering of the diameter of the connecting pin towards the free end of the clamping section. Both continuous and stepped changes in the diameter are possible.

In one refinement of the present invention, the connecting pin is arranged on an outer circumference of the clamping element, and the angle between it and the connecting device, which is likewise arranged on the outer circumference of the clamping element, for the power cable is between 80° and 100°.

This makes it possible to achieve a well-fitting and space-saving arrangement for various installation conditions.

In one refinement of the present invention, the connecting pin and the connecting device for a power cable are arranged one behind the other on the outer circumference of the clamping element such that they project radially from the outer circumference.

In one refinement of the present invention, the connecting pin and the connecting device for a power cable are arranged opposite one another on the outer circumference of the clamping element.

The present invention also provides a connecting cable, at whose end is provided at least one clamping element for partially engaging around a circumference of a clamping section of a connecting pin of a vehicle battery.

Such a cable, which has a pole terminal having an additional connecting pin according to the present invention at one end and a conventional pole terminal for the respective vehicle batteries at the other end, makes it possible to connect any number of vehicle batteries in parallel with one another by in each case two such cables creating the connection between in each case two batteries.

BRIEF DESCRIPTION OF THE DRAWINGS

Further features and advantages of the invention are described in the claims and the description in connection with the drawings, in which:

FIG. 1 shows a sectioned front view of a first embodiment of the pole terminal according to the invention along the lines I—I in FIG. 2 and FIG. 3, FIG. 2 shows a plan view of the pole terminal in FIG. 1, FIG. 3 shows a side view of the pole terminal in FIG. 1.

DETAILED DESCRIPTION

Figure 4:
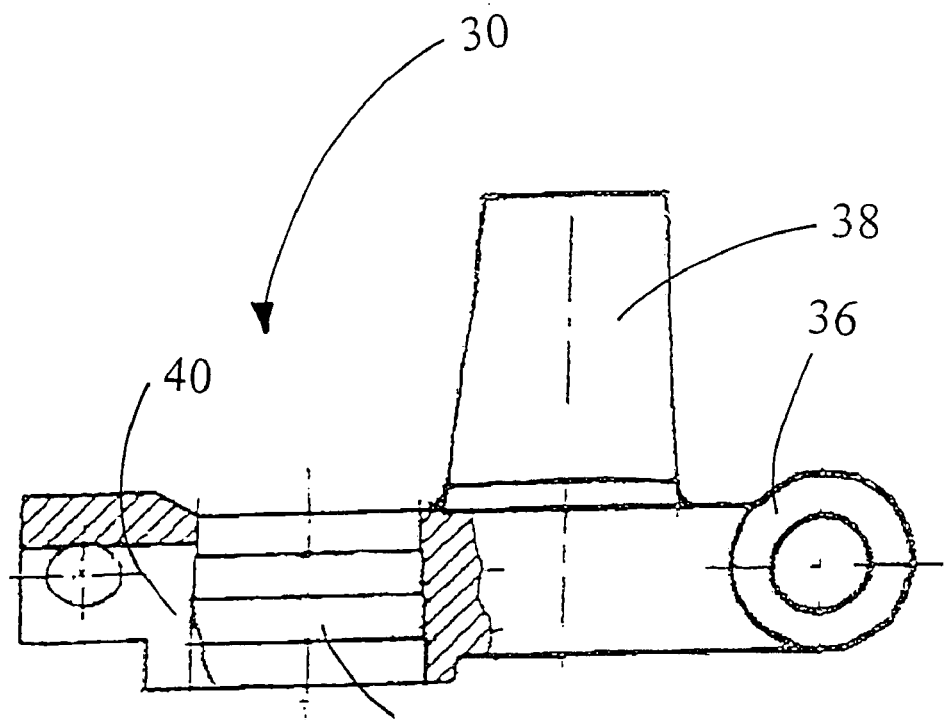
FIG. 4 shows a partially sectioned front view of a second embodiment of the pole terminal according to the invention.

FIGS. 1 to 3 show three different views of a pole terminal 10 according to a first embodiment of the present invention. The pole terminal 10 has a clamping element 12, comprising two clamping jaws 20 and 22. The inner faces of these clamping jaws 20 and 22 form a virtually enclosed frustoconical circumferential surface, which is only interrupted by a narrow separating joint running obliquely with respect to the central longitudinal axis 6 of the circumferential surface.

The inner circumference of the clamping element 12 has a cross section which tapers upward, the tapering taking place in the form of four steps. The inner circumferential surface is thus stepped and is composed of a total of four circular-cylindrical individual surfaces, whose circumference is reduced towards an upper side of the pole terminal 10, resulting overall in the frustoconical, inner circumferential surface. Alternatively, it is also possible for the tapering to be continuous. This then results in a frustoconical, inner circumferential surface.

The clamping jaws 20 and 22 each have a protrusion 24 and 26 having a through-hole. The central longitudinal axis of these through-holes runs perpendicular to the separating joint between the clamping jaws 20 and 22. By means of a threaded bolt 28, which passes through the two through-holes, and a nut 14, the clamping element 12 can be drawn together in order to be clamped to a battery pole. The oblique arrangement of the threaded bolt 28 in this case improves its accessibility when being tightened. Alternatively, it is also possible, however, to vary the arrangement of the threaded bolt depending on the installation situation.

In addition to the clamping element 12, the pole terminal 10 has, as further elements, a connecting device 16 for a power cable and a connecting pin 18, which makes it possible to connect a further pole terminal. The arrangement of this embodiment has the connecting device 16 for one or more power cables and the connecting pin 18 on the outer circumference of the clamping element 12 and offset through an angle of 90° with respect to one another.

The connecting pin 18 is frustoconical and tapers towards its free end. It is connected to the clamping element 12 via a protrusion which is bent back through 90°, with the result that a central longitudinal axis 8 of the connecting pin 18 runs parallel to the central longitudinal axis 6 of the inner circumferential surface of the clamping element 12. The shape of the connecting pin 18 corresponds to a battery pole of a vehicle battery to which the pole terminal 10 is intended to be connected.

The connecting device 16 for the power cable has a through-hole in the tangential direction with respect to the inner circumference of the clamping element 12 and perpendicular to its central longitudinal axis 6. The through-hole has a bevel on both exit surfaces to make it easier to insert the wires of the power cables. The connection between the wires and the connecting device is produced, for example, by pressing the connecting device 16 together.

The pole terminal 10 is preferably made of a brass alloy, if necessary galvanized.

Figure 5:
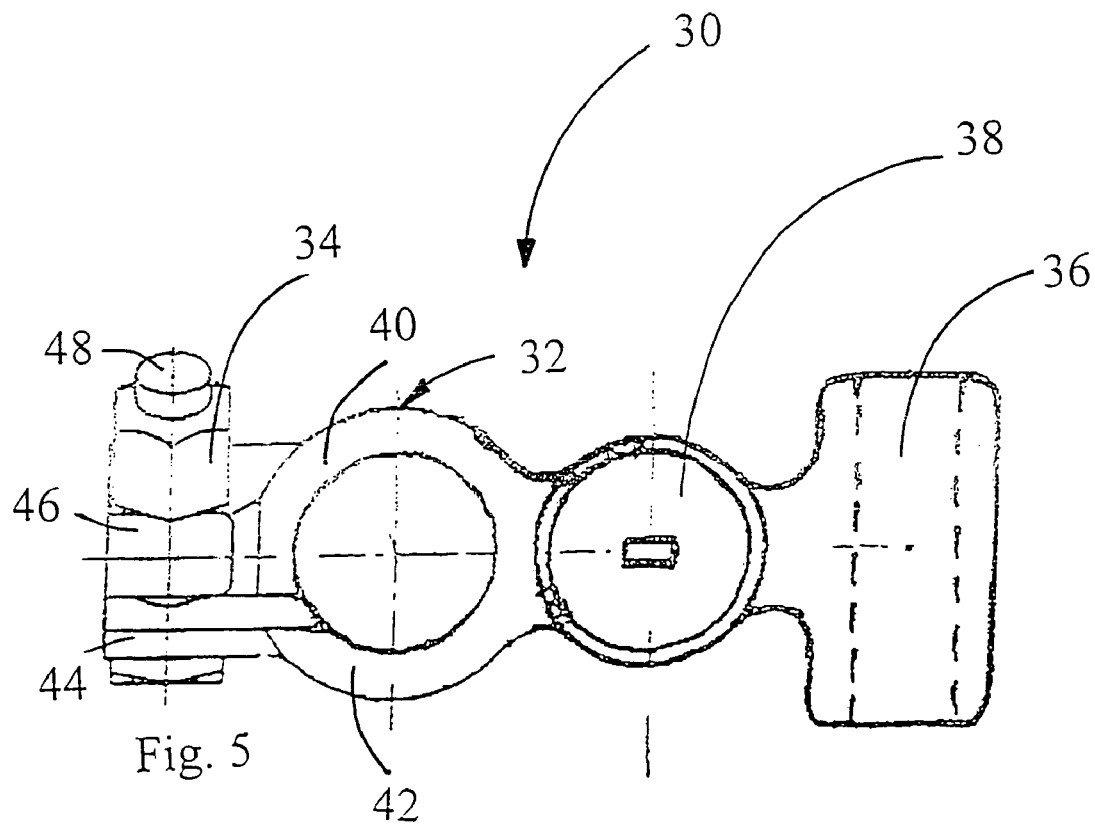
FIG. 5 shows a plan view of the pole terminal in FIG. 4.

FIGS. 4 and 5 show two different views of a pole terminal 30 according to a further embodiment of the invention. The pole terminal 30 according to the second embodiment is similar in design to the pole terminal shown in FIGS. 1 to 3. It differs from the latter pole terminal owing to the relative arrangement of a connecting pin 38 and a connecting device 36 for one or more power cables. The connecting device 36 for the power cable(s) is not positioned on the outer circumference of a clamping element 32, but is part of a protrusion, which projects from the clamping element 32 and on which is also arranged the connecting pin 38 for the connection of a further pole terminal. The connecting device 36 for the power cable(s) and the connecting pin 38 are thus connected to the clamping element 32 such that they are aligned one behind the other projecting radially from said clamping element 32, the connecting pin 38 being between the connecting device 36 and the clamping element 32. The connecting device 36 for the power cable(s) and the connecting pin 38 operate in the same way as that in the first embodiment shown in FIGS. 1 to 3. Depending on the installation situation, however, another arrangement, other than a radial one, may also be selected for the connecting device 36 and the connecting pin 38.

The clamping element 32 has the same design as the clamping element 12 in the first embodiment. It comprises two clamping jaws 40 and 42, which each have a protrusion 44 and 46 which can be drawn together using a threaded bolt 48 and a nut 34 in order to clamp the clamping element to a battery pole.

What is claimed is:

1. A connecting cable, comprising:
   at one end of said connecting cable, a first clamping element, the first clamping element configured to partially engage around a circumference of a clamping section of a connecting pin of a vehicle battery; and
   at another end of said connecting cable, a pole terminal, the pole terminal comprising:
   a second clamping element, the second clamping element configured to at least partially engage around a circumference of a clamping section of a battery connecting pin,
   a connector having a through-hole, said another end of the connecting cable being connected to said connector via said through-hole,
   and
   a pole terminal connecting pin having circumferential dimensions in one clamping section corresponding, within a predeterminable tolerance, to circumferential dimensions of the clamping section of the battery connecting pin.

2. The connecting cable as recited in claim 1 wherein a central longitudinal axis of the clamping section of the pole terminal connecting pin is aligned parallel to a central longitudinal axis of the second clamping element.

3. The connecting cable as recited in claim 1 wherein at least the clamping section of the pole terminal connecting pin is frustoconical.

4. The connecting cable as recited in claim 1 wherein the pole terminal connecting pin is arranged on an outer circumference of the second clamping element offset through an angle of between 80° and 100° relative to the connector, the connector also being arranged on the outer circumference of the clamping element.

5. The connecting cable as recited in claim 1 wherein the pole terminal connecting pin and the connector are arranged one behind the other on an outer circumference of the second clamping element and project radially from the outer circumference.

6. The connecting cable as recited in claim 1 wherein the pole terminal connecting pin and the connector are on opposing sides of the second clamping element.

7. The connecting cable as recited in claim 1 wherein the connector is connected to said another end of the connecting cable by pressing the connector together to connect wires of the connecting cable to the through-hole of the connector.

* * * * *